United States Patent [19]

Okuda et al.

[11] 4,017,339
[45] Apr. 12, 1977

[54] FLUX FOR USE IN SUBMERGED ARC WELDING OF STEEL

[75] Inventors: Naoki Okuda, Fujisawa; Kazuo Tanaka, Yokosuga, both of Japan

[73] Assignee: Kobe Steel Ltd., Kobe, Japan

[22] Filed: Nov. 29, 1974

[21] Appl. No.: 528,554

[30] Foreign Application Priority Data

Nov. 29, 1973 Japan .............. 48-135041

[52] U.S. Cl. .................. 148/24; 148/26
[51] Int. Cl.$^2$ ..................... B23K 35/34
[58] Field of Search .............. 148/24, 26

[56] References Cited
UNITED STATES PATENTS

| | | | |
|---|---|---|---|
| 2,308,801 | 1/1943 | Anderson | 148/26 |
| 2,467,544 | 4/1949 | Whitcomb | 148/26 |
| 3,511,701 | 5/1970 | Mouton | 148/26 |
| 3,745,294 | 7/1973 | Arikawa | 148/26 |

*Primary Examiner*—Peter D. Rosenberg
*Attorney, Agent, or Firm*—Oblon, Fisher, Spivak, McClelland & Maier

[57] ABSTRACT

A flux for use in submerged arc welding of steel, is formed from 10 – 70% iron powder, 10 – 50% MgO, 3 – 25% CaO, 2 – 25% carbonate based on the $CO_2$ content, 0.03 – 1.5% of a compound or mixture containing boron oxide, the weight being based on the $B_2O_3$ content, less than 15% $TiO_2$, and at least one deoxidizing metallic agent selected from the group consisting of Si, Mn, Al, Ti and alloys thereof.

3 Claims, 4 Drawing Figures

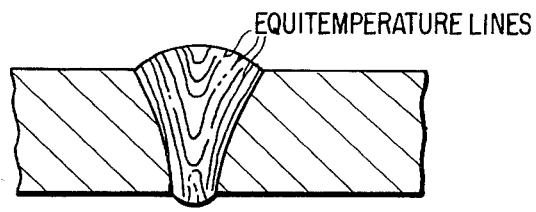
FIG.1
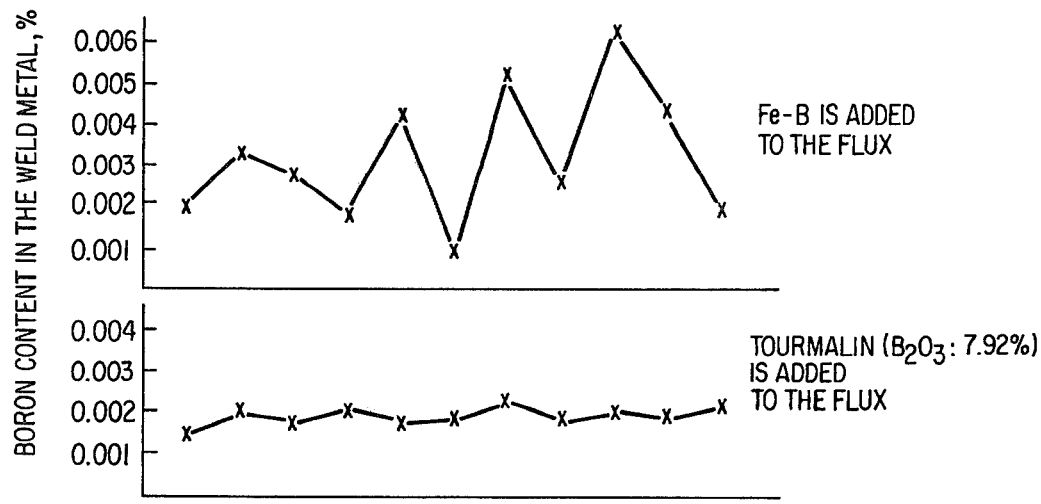
FIG.2 PICKING POSITION OF TEST PIECE (BEAD CENTER, THE CENTRAL POSITION OF PLATE THICKNESS)
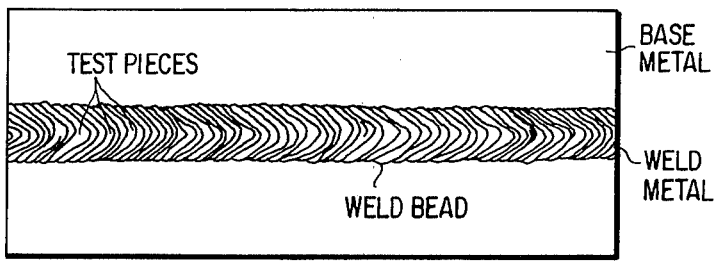
FIG.3
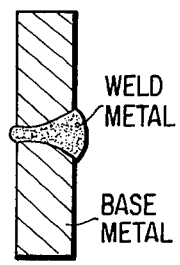
FIG.4

FLUX FOR USE IN SUBMERGED ARC WELDING OF STEEL

BACKGROUND OF THE INVENTION

1. Field of the Invention

This invention relates to a flux which has particular utility in submerged arc welding of steel, which enables excellent welding workability and which provides a weld metal of excellent mechanical properties.

2. Description of the Prior Art

Submerged arc welding is widely used for butt welding of steel since it is the most economical, in terms of labor costs, for such welding procedures. In recent years there has been significant improvements made in submerged arc welding processes, which have made that technique even more efficient. For instance, in recent years, such innovations as one side submerged arc welding, multielectrode welding and large heat input welding for double groove joints, have been developed. However, in submerged arc welding processes which require large heat input, the degree of dilution of the base metal is often so large that the weld metal can be adversely affected by the chemical composition of the base metal, and a columnar structure can develop in the weld metal. This tends to coarsen the crystal grains of the weld metal and cause the formation of non-metallic inclusions in the coarse grain boundaries. Accordingly, it has been very difficult to obtain a weld metal of sufficiently good impact properties, as might have been expected.

Multielectrode welding which requires large heat inputs not only adversely affects the impact properties of the weld metal, but it also can be a detriment to the welding operability. It has been attempted to overcome these defects using conventional fluxes, however, the use of such conventional fluxes have not proven to be entirely successful. Other methods attempted to alleviate these difficulties included decreasing the oxygen content in the weld metal by increasing the basicity of the flux; refining the microstructure of the weld metal by the addition of Mo into the filler wire or into the flux; refining the microstructure of the weld metal by addition of B into the flux or the wire in the form of simple substance or ferroboron, in vey small amounts. These methods likewise have not proven to be completely satisfactory for all purposes.

If the basicity of the flux is increased so as to decrease the oxygen content of the weld metal, it is impossible to maintain a constant chemical composition for the weld metal, and it is also impossible to uniformly obtain stable impact properties in the weld metal.

If an alloying element such as Mo is added to the flux or to the weld wire, the tensile strength of the weld metal will be unnecessarily increased, causing an increase in crack sensitivity.

If B is added into the flux or into the welding wire in the form of elemental boron or a ferroboron, the impact properties of the weld metal will be greatly improved, however, it will be difficult to prevent segregation of B during welding especially if the welding conditions are varied by a large heat input or during production of the flux or the welding wire. Moreover, if the welding groove is not even, it is critical and difficult to control the welding conditions to obtain an even weld bead. Accordingly, satisfactory effects have not heretofore been obtainable using conventional fluxes, when large heat input welding processes are used.

SUMMARY OF THE INVENTION

Accordingly, one object of the present invention is to eliminate the above mentioned defects of the conventional technology.

Another object of the invention is to provide a welding flux for use in submerged arc welding of steel which greatly improves the impact properties of the weld metal.

A still further object of the invention is to provide a welding flux for use in submerged arc welding of steel which provides a weld metal which is free of cracks or boron segregation of boron.

These and other objects of this invention have herein been attained by the provisions of a welding flux for use in submerged arc welding of steel which comprises 10 – 70% iron powder, 10 – 50% MgO, 3 – 25% CaO, 2 – 25% carbonate based on the amount of $CO_2$, 0.03 – 1.5% of a compound or mixture which contains boron oxides, based on the amount of $B_2O_3$, less than 15% $TiO_2$, and at least one deoxidizing metallic agent selected from the group consisting of Si, Mn, Al, Ti and alloys thereof.

In another embodiment of this invention, the welding flux indicated above further contains at least one of 1.2 – 5.0% Si in the form of Fe—Si or Si—Mn, 1.0 – 6.0% Mn in the form of Fe—Mn, metallic manganese or Si—Mn, and up to 4.5% total weight of Ti and Al.

BRIEF DESCRIPTION OF THE DRAWINGS

FIG. 1 illustrates cross sectional view showing temperature gradient in the weld metal.

FIG. 2 illustrates graphs showing boron content in the weld metal.

FIG. 3 illustrates the picking position of a test piece (bend center, the central position of the plate thickness as a function or FIGS. 1 and 2).

FIG. 4 illustrates an end view of the plate of FIG. 3.

DETAILED DESCRIPTION OF THE PREFERRED EMBODIMENTS

A flux according to this invention comprises boron oxide in the form of compound or mixture which contains or is formed from boron oxide, which has a low melting point and a low boron density. The boron is not contained in the form of elemental boron or in the form of a ferroboron, as in the prior art. During the slag reaction, the boron transfers into the weld metal under the influence of a deoxidizing agent, such as Mn, Si, Ti, Al, or an alloy thereof. Segregation of boron is thereby avoided, and stable and excellent impact properties of the weld metal can be obtained. Excellent welding workability and a beautifully shaped welding bead can be obtained.

The boron oxide, compound or mixture, is used in an amount of 0.03 – 1.5% by weight based on the amount of $B_2O_3$. The pressure of this material has the effect of extremely lowering the melting point of the flux. If the welding conditions are changed, the melting ratio between the welding wire and the flux will remain relatively constant, as compared with the conventional fluxes. Accordingly, segregation of boron in the weld metal is suppressed, which results in very significant improvements in the impact properties of the weld metal. A quite sound weld metal, which is relatively crack-free is thus obtained. Namely, if boron is admixed into the flux in the form of elemental boron or ferroboron, a very small portion of the flux will contain the boron containing additives. In other words, on a microscopic level, the distribution of the boron is quite poor due to the fact that the flux particles will vary in size, when the boron is incorporated in the form of elemental boron or ferroboron. Thus, when the flux is melted and transferred into the weld metal by the heat of the welding arc, the concentration of boron being transferred will be non-uniform. In other words, boron is not uniformly dissolved in every part of the weld metal from the microscopic point of view. Of course, molten metallic boron will be mixed into the molten weld metal to some extent. However, the mixing will not be sufficient and the temperature gradient in the weld metal will be quite steep, as is illustrated in FIG. 1, such that the molten weld metal will be solidified along the equitemperature lines in an overlapping manner instead of in a continuous solidification manner. The result is that not only boron, but also other elements will become segregated onto the equitemperature lines, or the overlapping boundaries, in high concentration, as is well known, when these elements are added to the flux in certain sized metallic particles.

In the present invention, these difficulties are overcome by using the boron in the flux in the form of boron oxide. Boron oxide will, by nature, be uniformly melted into the molten slag and this will melt into the weld metal, acting on the "Distribution Law" at the facing surface between the molten slag and the weld metal. Therefore, in every portion of the weld metal, the following formula will prevail:

$$\frac{\text{boron concentration in the weld metal}}{\text{boron concentration in the slag}} \frac{[B]}{(B)} = \text{constant } (K)$$

i.e., $\frac{[B]}{(B)} = (K)$

Accordingly, even if the slag amount changes through a change in welding condition, the boron content of the weld metal will not change in every part of the bead. If it does change, the amount of change will be very small as is apparent from FIG. 2.

Moreover, deoxidizing agents, such as Mn, Si, Al and Ti will function in the molten slag as a reducing atmosphere, such that the ratio constant (K) will be increased, since the boron oxide in the slag will be transferred into the weld metal, as elemental boron.

On the other hand, according to conventional welding processes which use a bonded flux of a metallic boron in the form of elemental boron or ferroboron, which has such a basic (pH) chemical composition, the cooling rate of the slag will be very high and very small amounts of elemental boron will be changed into boron oxide in the molten slag. Thus, segregation of boron in the weld metal cannot be avoided. This explains the reason why the addition of boron oxide, compound of mixture containing boron oxide from the beginning gives an unexpected favorable result in the weld metal.

In the present invention, it is preferable that the boron oxide, compound or mixture containing boron oxide should be added into flux in an amount of 0.03 – 1.5% based on the amount of $B_2O_3$. Within this limitation, the microstructure of the weld metal will be very fine and hence impact toughness of the weld metal will be favorable. Below 0.03%, the impact properties will be insufficient and the melting point of the flux will be disadvantageously lowered. Over 1.5% the tensile strength of the weld metal will be unnecessarily increased, which causes crater cracks, or transverse cracks to occur on the weld metal. Also, the melting point of the flux will be lowered to too great an extent. If boron is added into the flux in the form of elemental boron or ferroboron, the melting point of the flux will be too high, thus causing a change in the welding conditions, and a change in the melting ratio between the welding flux and the welding wire. The quantity of boron transferred into the weld metal will then be too large.

Deoxidizing agents such as Mn, Si, Ti and Al or alloys thereof, should be admixed into the flux depending on the amount of compound or mixture containing boron oxide. The exact quantity of such agents will, of course, depend upon the deoxidizing effects, the ability to recover these elements, the basicity of the flux and type of flux.

Accordingly, when the types and amount of these deoxidizing agents are as follows, the favorable results are obtained according to the following:
1. Si content in the flux in the form of at least one of ferrosilicon, silicon-manganese, etc.
   1.2 – 5.0% by weight of total flux.
2. Mn content in the flux in the form of at least one of ferromanganese, metallic manganese, silicon manganese, etc.
   1.0 – 6.0% by weight of total flux.
3. Total content of Ti and Al should be up to 4.5%.

Further, Si and Mn serve to remove impurities from the weld metal, thus they prevent pitting or blow hole formation on the weld metal, and they enable the formation of beads of a quite beautiful appearance. The result is an improvement in mechanical properties of the weld metal. Therefore, the above mentioned ranges of Si and Mn are necessary. If Si content is less than 1.2% and Mn content is less than 1.0%, the weld metal will not be sufficiently deoxidized, and simultaneously the amount of boron which will be transferred into the weld metal from the boron oxide will not be improved. In contrast, if the Si and Mn contents are over the above-mentioned upper limits, too much Si and Mn will be transferred into the weld metal, resulting in a deterioration in toughness of the weld metal, even if the boron oxide is used within the above-mentioned range.

Further, alloying elements such as Mo, Ni, Cr can optionally be added to the flux according to need. It is preferable that the boron oxide compound should have a low boron concentration and should lower the melting point of the flux. Particularly suitable such compounds include borosilicate, borosilicon glass or borosilicate mineral anhydride, i.e., tourmaline, danburite, kotoite or suanite.

Another feature of this invention is that the welding workability in large heat input welding will be improved and the bead appearance will also be improved.

Iron powder is present in the welding flux. The amount of melted flux is very large especially in large heat input welding. Accordingly, the addition of iron powder to the flux serves to increase the transfer of molten metal into the weld metal, thus improving welding efficiency. In large heat input welding, the increase in welding speed will largely contribute to the welding operability. However, if iron powder is added in amounts exceeding 70%, the apparent density of the flux will be increased, which will adversely affect workability and will deteriorate the bead appearance. If the iron powder content is below 10%, improvements in welding efficiency cannot be expected.

If the quantity of MgO is below 10%, slag generation will be inferior and the formation of a well shaped bead will not be obtained if it exceeds 50%, a stable arc will not be generated, so that welding workability will be adversely affected.

The CaO should be added to the flux in an amount of 3 – 25%, which serves to improve slag fluidity and to smooth the bead appearance. If it is added in amounts exceeding 25%, projections will be found on the bead.

The $CO_2$ serves to stabilize the arc by providing a $CO_2$ atmosphere. If it is below 2%, its function cannot be provided whereas more than 25% will cause the generation of too much $CO_2$ which can cause deterioration in workability. Accordingly, in the present invention, the quantity of carbonate to be used is 2 – 25% with respect to the $CO_2$.

The $TiO_2$ should be added in amounts of less than 15% to assure proper bonding of the bead and the base metal and to provide improved brilliance of the bead. If the $TiO_2$ content is over 15%, valleys and peaks in the bead will occur.

Accordingly, the flux of this invention should comprise, by weight of the total flux, 10 – 70% iron powder, 10 – 50% MgO, 3 – 25% CaO, 2 – 25% carbonate based on the amount of $CO_2$, 0.03 – 1.5% $B_2O_3$ in the form of boron oxide, compound or mixture containing boron oxide, less than 15% $TiO_2$, a deoxidizing agent selected from the group consisting of Si, Mn, Al, Ti and alloys thereof, and optionally, an alloying element selected from the group consisting of Mo, Ni and Cr. This flux provides excellent welding workability, a well shaped bead appearance, and a weld metal of favorable mechanical properties.

As shown in Example 1, Table 4, if the flux composition is not within the above limitation, a beautiful, well shaped bead appearance or preferable mechanical properties cannot be obtained. According to this invention, besides the above-mentioned essential compositions, $SiO_2$, $CaF_2$, $ZrO_2$, MnO, $MnO_2$ which are generally contained in sintered flux can be properly added to the flux, if desired.

Having generally described the invention, a further understanding can be obtained by certain specific examples which are provided herein for purposes of illustration only and are not intended to be limiting in any manner.

EXAMPLE 1

Flux materials of A – H types of fluxes shown in Table 1 are thoroughly mixed, then, 16% of water glass is added to the mixture and the flux is sintered in such a manner that the grain size of flux particle is 10 – 65 mesh (Tyler No.). The sintered flux is used in combination with a welding wire, the chemical composition of which is shown in Table 2. 45% "Y" groove having root gap of 6 mm, the thickness of the base metal is 35 mm, 5 kg/mm² class high tensile strength steel is one side welded, supported by a backing member consisting of a copper sheet and backing flux. The welding conditions are shown in Table 3.

The welding results are shown in Table 4.

TABLE 1

| | Flux material (%) | | | | | | | |
|---|---|---|---|---|---|---|---|---|
| | flux type | | | | | | | |
| flux material | A | B | C | D | E | F | G | H |
| magnesia clinker | 20 | 20 | 15 | 15 | 15 | 15 | 10 | 10 |
| calcium, carbonate ($CO_2$) | 15(6.6) | 15(6.6) | 18(3.5) | 8(3.5) | 15(6.6) | 15(6.6) | 8(3.5) | 8(3.5) |
| alumina | 5 | 5 | 4.5 | 3 | 5 | 5 | 5 | 5 |
| fluorite | 4.2 | 5.5 | 4 | 3 | 2 | 2 | 4 | 4 |
| rutile | 5 | 5 | 20 | 20 | 5 | 5 | 20 | 20 |
| silica sand | 10 | 7 | 5 | 4.5 | 5.2 | 3.5 | 8.5 | 8.5 |
| zircon sand | 1.5 | 1.5 | 1.5 | 1.5 | 1.5 | 1.5 | 1.5 | 1.5 |
| iron powder | 30 | 30 | 30 | 30 | 40 | 40 | 40 | 40 |
| Fe-Si | 4 | 4 | 4 | 4 | 4 | 4 | 4 | 4 |
| Fe-Mn | 3 | 3 | 3 | 3 | 3 | 3 | 3 | 3 |
| Fe-Ti | 1 | 1 | 1 | 1 | 3 | 3 | 3 | 3 |
| Fe-Mo | 1 | 1 | 1 | 1 | 1 | 1 | 1 | 1 |
| glass composition | 0.3 | 2 | 3 | 5 | 0.3 | 2 | 3 | 5 |
| ($B_2O_3$) | (0.026) | (0.172) | (0.259) | (0.431) | (0.036) | (0.172) | (0.259) | (0.431) |

TABLE 2

| Chemical composition of welding wire (wt%) | | | | |
|---|---|---|---|---|
| C | Mn | Si | P | S |
| 0.06 | 0.37 | 0.01 | 0.008 | 0.011 |

TABLE 3

| | Welding condition | | | | | |
|---|---|---|---|---|---|---|
| Electrode | Wire diameter (mm) | Wire inclination (degree) | welding current (amp) | welding voltage (volt) | welding speed (cm/min) | Distance between electrodes (mm) |
| L(first) | 4.8 | 15 | 1400 | 35 | 40 | |
| $T_1$(second) | 4.8 | 0 | 1200 | 42 | 40 | 35 |
| $T_2$(third) | 6.4 | −5 | 1200 | 50 | 40 | 140 |

Note) Three passes are laid by using three electrodes L, $T_1$, and $T_2$ simultaneously

TABLE 4

Mechanical property and bead appearance of weld metal

| Flux type | Impact property vE-10(kg-m) | vE-60(kg-m) | Tensile strength (kg/mm$^2$) | Bead appearance |
| --- | --- | --- | --- | --- |
| A | 3.8 | 2.0 | 56.8 | ○ |
| B | 8.4 | 6.0 | 57.3 | ⊙ |
| C | 9.0 | 5.4 | 58.1 | Δ |
| D | 10.5 | 5.8 | 64.8 | Δ |
| E | 4.2 | 2.5 | 57.0 | ⊙ |
| F | 9.8 | 6.3 | 58.0 | ⊙ |
| G | 10.1 | 6.5 | 59.5 | X |
| H | 9.8 | 5.8 | 63.8 | X |

Note) Values of vE-10 and vE-60 are mean values of three pieces, and judgement of bead appearance is measured, ⊙ is very good, ○ is good, Δ is a little bad, and X is bad

EXAMPLE 2

Flux shown in Example 1, A, B, C and D are used. 50 kg/mm$^2$ class high tensile strength steel having thickness of 35mm is used as base metal. Double groove joint is welded under the welding condition shown in Table 5. The results of the welding is shown in Table 6.

TABLE 5

Welding condition

| Welding method | Pass | Electrode | Welding current (amp) | Welding voltage (volt) | Welding speed (cm/min) | Distance between electrodes (mm) |
| --- | --- | --- | --- | --- | --- | --- |
| Double-Vee both side welding | 1 | L | 1000 | 37 | 45 | 80 |
| | | T | 1000 | 42 | 45 | |
| | 2 | L | 1200 | 35 | 40 | 80 |
| | | T | 1000 | 40 | 40 | |

TABLE 6

Mechanical properties and bead appearance of weld metal.

| Flux type | Impact property vE-10(kg-m) | vE-60(kg-m) | Tensile strength (kg/mm$^2$) | Bead appearance |
| --- | --- | --- | --- | --- |
| A | 4.0 | 3.5 | 56.9 | ○ |
| B | 8.8 | 6.0 | 59.8 | ⊙ |
| C | 9.0 | 5.8 | 60.0 | ⊙ |
| D | 10.0 | 5.8 | 63.8 | ○ |

As hereinbefore mentioned, the flux according to the invention provides a sound weld metal having excellent impact properties, i.e., the weld metal formed using the flux of the invention has favorable mechanical properties, and the welding workability is very good. Furthermore, the boron oxide contained the flux helps to lower the melting point of the flux, thus making it easy to remelt the slag formed by the leading pass during multi-electrode welding, requiring large heat input. Thereby, the molten pool is kept stabilized during the entire welding operation, such that the welding workability and bead appearance are both greatly improved by the present invention.

Having now fully described the invention, it will be apparent to one of ordinary skill in the art that many changes and modifications can be made thereto without departing from the spirit or scope of the invention as set forth herein.

What is claimed as new and intended to be covered by Letters Patent is:

1. A flux composition which is useful in submerged arc welding of steel, which comprises:
10 – 70% iron powder, 10 – 50% MgO, 3 – 25% CaO, 2 – 25% CO$_2$ as derived from a carbonate compound, 0.03 – 1.5% B$_2$O$_3$ as derived from B$_2$O$_3$ itself, a boron compound from which B$_2$O$_3$ can be derived or mixtures thereof, less than 15% TiO$_2$, and at least one deoxidizing metallic agent selected from the group consisting of Si, Mn, Al, Ti and alloys thereof.

2. The flux composition of claim 1, which additionally contains Si in an amount of 1.2 – 5.0% in the form of Fe—Si or Si—Mn, Mn in an amount of 1.0 – 6.0% in the form of Fe—Mn, metallic manganese or Si—Mn, and Ti and Al in an amount of up to 4.5% total.

3. The flux composition of claim 1, wherein the boron oxide is present in the form of borosilicate, borosilicon glass or borosilicate mineral anhydride.

* * * * *